(12) United States Patent
Bohlender

(10) Patent No.: US 6,402,943 B1
(45) Date of Patent: Jun. 11, 2002

(54) DIESEL FILTER SYSTEM

(75) Inventor: Franz Bohlender, Kandel (DE)

(73) Assignee: David & Baader DBK, Kandel/Pfalz (DE)

( * ) Notice: Subject to any disclaimer, the term of this patent is extended or adjusted under 35 U.S.C. 154(b) by 0 days.

(21) Appl. No.: 09/521,229

(22) Filed: Mar. 8, 2000

(30) Foreign Application Priority Data

Mar. 18, 1999 (EP) .............................. 99105570

(51) Int. Cl.$^7$ ...................... B01D 35/18; F02M 31/125; F02M 37/22; H05B 3/06; H05B 3/12
(52) U.S. Cl. ...................... 210/184; 210/186; 123/557; 219/505; 392/488; 392/491; 392/493; 392/502; 392/503
(58) Field of Search ................. 210/184, 186; 123/557; 219/205, 505; 392/502, 493, 491, 488, 503

(56) References Cited

U.S. PATENT DOCUMENTS

| 3,235,084 A | | 2/1966 | King et al. |
| 3,737,621 A | | 6/1973 | Elkins |
| 4,147,927 A | * | 4/1979 | Pirotte |
| 4,447,706 A | * | 5/1984 | Eder et al. |
| 4,539,108 A | | 9/1985 | Izutani et al. |
| 4,818,842 A | * | 4/1989 | Walty |
| 4,976,852 A | * | 12/1990 | Janik et al. |

FOREIGN PATENT DOCUMENTS

| DE | 2114401 | | 2/1972 | ............ H05B/3/78 |
| DE | 2316054 | | 10/1974 | .......... F02M/31/12 |
| DE | 85 31 912 | | 3/1986 | .......... F02M/31/12 |
| DE | 43 09 099 A1 | | 9/1994 | ........... F23D/11/44 |
| EP | 0 057 172 A2 | | 4/1982 | ............ H05B/3/14 |
| EP | 175653 | * | 3/1986 | |
| EP | 0 581 176 A2 | | 2/1994 | ......... F02M/31/125 |
| FR | 619 882 | | 11/1927 | |
| FR | 2 634 090 A1 | | 12/1990 | ............ H05B/3/82 |
| GB | 2 984 437 A | | 7/1982 | ............ H05B/3/12 |
| JP | 58-096161 | * | 6/1983 | |
| JP | 59-218355 | * | 12/1984 | |

\* cited by examiner

Primary Examiner—Thomas M. Lithgow
(74) Attorney, Agent, or Firm—Michael Best & Friedrich LLP

(57) ABSTRACT

The present invention provides a diesel filter system and a fuel heating device comprising a PTC heating element and a rod-shaped heat conductor which is in thermal contact with PTC heating element. The rod-shaped heat conductor comprises at least two tubular parts arranged in parallel. The PTC heating element is located between said at least two tubular parts. The system and device according to the invention is of compact constructional design and can therefore be installed in different kinds. The invention increases the rate of flow and allows for a high heat transfer from the PTC heating element to fuel.

22 Claims, 3 Drawing Sheets

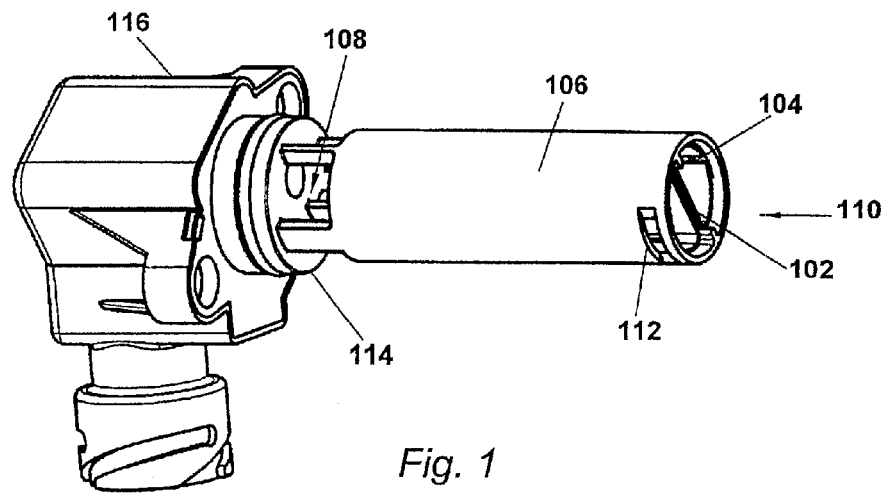
Fig. 1
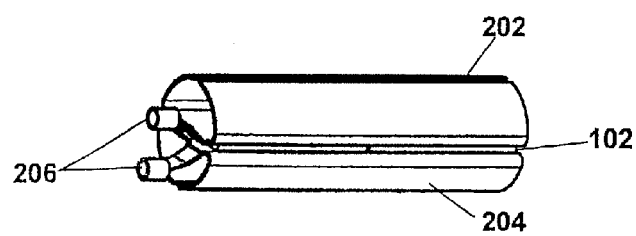
Fig. 2
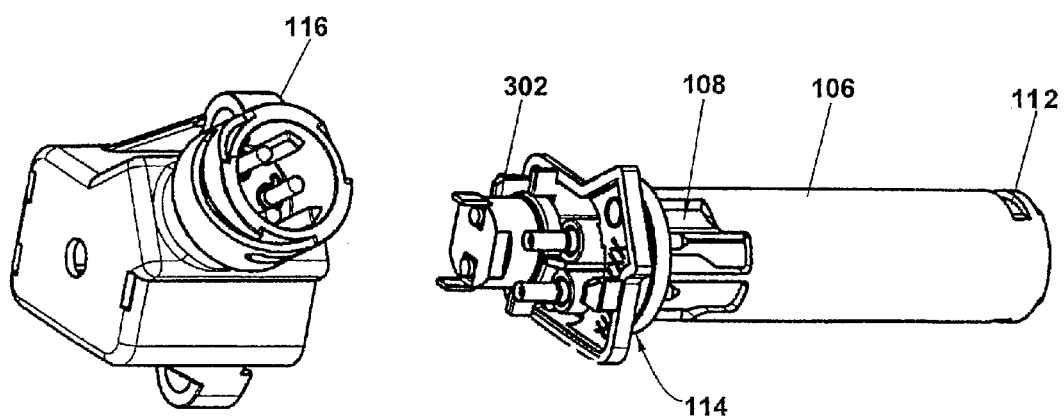
Fig. 4
Fig. 3

DIESEL FILTER SYSTEM

BACKGROUND OF THE INVENTION

1. Field of the Invention

The invention generally relates to diesel filter systems and fuel heating devices for use in such systems, and in particular to systems and heating devices comprising a PTC heating element and a heat conductor which is in thermal contact with a PTC heating element.

2. Description of the Related Art

Presently, diesel engines are equipped with highly developed injection mechanics requiring high quality filtration techniques for guaranteeing reliable operation of the diesel engine. Diesel filter systems used for this purpose may be arranged at any position between the fuel tank and the diesel engine. Besides, the lifetime of the diesel injection assembly is largely influenced by the quality of the fuel filter.

Diesel fuel filters of different constructional design are well known. Usually, the actual filter element consists of high-grade impregnated very fine special purpose filter paper, but it make likewise consist of felt. The diesel filter system serves first of all for removing water in the fuel to prevent damage of the engine and to avoid destructive acidification. Moreover, solid particles such as oxides, dirt and dust particles are filtered out of the fuel.

At low temperatures, it is necessary to apply a filter heating to liquefy the paraffin portion in the diesel fuel. Thereby the lubricity of the fuel is increased and cold starting diesel engines is facilitated. Furthermore, the processes of forming waxes and gels are impeded and the lifetime of the fuel filter is increased.

Many heating devices for diesel oil have been developed, which apply PTC heating elements. Such heating elements are equipped with cold conducting thermistors having a positive temperature coefficient (PTC). PTC resistors are usually made of ferroelectrical ceramic semiconductor material in the form of rods, disks or pellets on the basis of barium titanate and metal oxides or salts. Because of the positive temperature coefficient within a certain temperature range, PTC thermistors are suitable in particular for temperature controls.

A diesel heating device using PTC elements is for instance known from EP 0 162 939 B1. This heating device is an integral part of a fuel filter consisting of a housing in which a filter cartridge is put into a removable base. The PTC elements are formed having a central hole and are positioned and fixed together with contact plates at locking pins of the housing. Such a heating device therefore requires a specifically constructed arrangement in the fuel filter.

SUMMARY OF THE INVENTION

The present invention has been made in consideration of the above-situation and has as its primary object to provide a diesel filter system and fuel heating device having enhanced installation capabilities.

It is another object of the present invention to increase heat transfer from the PTC heating element to the fuel.

A further object of the present invention is to allow for a higher rate of flow in combination with a compact arrangement of the diesel filter system and fuel heating device.

It is still another object of the present invention to provide a diesel filter system and fuel heating device specifically designed for applications in trucks and large emergency power plants.

Another object of the present invention is to provide a fuel heating device which is capable of being incorporated into different diesel filter systems without high constructional efforts.

Furthermore, it is an object of the present invention to provide a heating device which can be used as a supplementary accessory system.

These and other objects of the present invention will become apparent hereinafter.

To achieve these objects, the present invention provides a diesel filter system comprising filter means and fuel heating means. Said fuel heating means comprises a PTC heating element and a rod-shaped heat conductor being in thermal contact with the PTC heating element. The rod-shaped heat conductor comprises at least two tubular parts arranged in parallel. The PTC heating element is located between said at least two tubular parts.

According to a second aspect, the invention provides a fuel heating device for use with diesel filter systems. The device comprises a PTC heating element and a rod-shaped heat conductor being in thermal contact with the PTC heating element. The rod-shaped heat conductor comprises at least two tubular parts arranged in parallel. The PTC heating element is located between said at least two tubular parts.

By means of said two tubular parts arranged in parallel in the heat conductor, an axial passage of the fuel is achieved. This leads to an improved fuel guiding. Due to the tubular construction of the heat conductor, there is an opening required for the installation of the heating device according to the present invention of only such a kind that may be advantageously made for instance by drilling. It is then possible to seal the fuel heating device in a simple manner by means of an O-ring.

Since the PTC heating element is positioned between both parts of the heat conductor, the heat transfer is advantageously improved, leading to a higher rate of flow in combination with a compact constructional design. The heat conductor may be formed of sheet metal which reduces significantly the fabrication costs. Further, the heat conductor may advantageously be equipped with a perforated outer wall thereby allowing for a transversal flow additionally to the axial fuel passage. This transversal flow again improves the heat transfer to the fuel, thereby again allowing for increasing the rate of flow.

Further, the PTC heating element and the heat conductor may be held in a rod-shaped heater housing, thereby increasing the mechanical stability of the heating device. In order to reduce the rate, the heater housing may be made of plastics. For allowing simple assembly and disassembly of the heating device, the heater housing may further be equipped with a housing base part. Further, for giving the system the capability of automatically switching on and off, a temperature switch may be put into the housing.

Finally, the PTC heating element may be formed by a plurality of thermistors. This compensates for device tolerances and increases the reliability of the heating device.

BRIEF DESCRIPTION OF THE DRAWINGS

The accompanying drawings are incorporated into and form a part of the specification to illustrate several examples of the present invention. These drawings together with the description serve to explain the principles of the invention. The drawings are only for the purpose of illustrating preferred and alternative embodiments of how the invention can be made and used and are not to be construed as limiting the invention to only the illustrated and described embodiments. Further features and advantages become apparent from the following and more particular description of the various embodiments of the present invention, as illustrated in the accompanying drawings, wherein:

FIG. 1 illustrates a first preferred embodiment of the fuel heating device according to the present invention;

FIG. 2 illustrates the heat member of the first embodiment;

FIG. 3 illustrates the heater housing of the first embodiment;

FIG. 4 illustrates a connecting part for putting in the fuel heating device of the first embodiment;

DETAILED DESCRIPTION OF THE INVENTION

Figure 5:
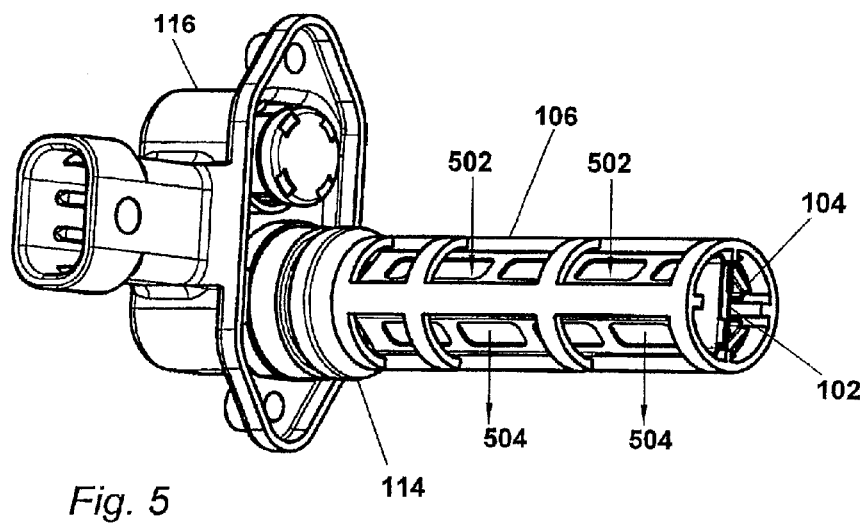
FIG. 5 illustrates a second embodiment of the fuel heating device according to the present invention.

The illustrated embodiments of the present invention will be described with reference to the figure drawings, wherein like elements and structures are indicated by like reference numerals.

Referring now to the drawings and in particular to FIG. 1, there is illustrated a first preferred embodiment of the invention. A rod-shaped heater housing 106 includes the PTC heating element 102 and the heat conductor 104. The heater housing 106 is equipped with a housing base part 114 being put in a connecting part 116. The fuel enters the heating device through the opening 108, passes the rod-shaped arrangement of the heating device and leaves the arrangement through the opening 110.

By means of this axial passage a very compact construction is made possible. The diameter of the heater housing 106 amounts to 0.8" in the preferred example. The length of the heating device when built in preferably amounts to 3.1". Further, it is also possible to embody the connecting part 116 in a compact manner.

FIG. 2 provides a more detailed view of the heat member according to the present embodiment of the invention. As shown, the PTC heating element 102 is on both sides surrounded by rod-like bent heat conducting sheets 202, 204. The connection between the PTC heating element and the heat conducting sheets is preferably done by adhesive. It will however be appreciated by those of ordinary skill in the art that clamping, riveting, screwing, soldering, welding or any other technique may likewise be applied.

Forming the heat conducting sheets 202, 204 is preferably done by bending or folding. However, heat conductors formed in another manner or being pressed may also be used.

The PTC heating element 102 is preferably electrically connected to plug-in connectors 206 which may be attached to suitable counterpart contacts of the housing base part 114.

Referring now to FIG. 3 which illustrates a preferred heater housing of the present embodiment of the invention, the heater housing 106 comprises fuel inlet openings 108 at its base part side as well as a corresponding fuel outlet opening 110 at its end. The heater housing 106 is positioned and fixed to the heat member shown in FIG. 2, preferably by means of snap-in cutouts 112.

The heater housing 106 consists of synthetic materials such as polyethylene. The heat conductor 104 formed of the heat conducting sheets 202, 204 consists in the illustrated embodiment of aluminium or an aluminium alloy having a relatively low thermal capacity and excellent thermal conductivity.

Further, a temperature switch 302 is shown in FIG. 3 being an integral part of the housing base part 114. By means of the temperature switch 302 the heating device can be switched on and off depending on the temperature.

FIG. 4 illustrates a connecting part for receiving the heating device according to the first preferred embodiment of the invention. The connecting part 116 comprises electrical plug-in connectors for establishing a power supply to both the PTC heating element and the temperature switch.

A second embodiment of the present invention is shown in FIG. 5. This embodiment differs from the arrangement of FIGS. 1 to 4 mainly in the design of the heat conducting sheets and the heater housing.

Figure 6:
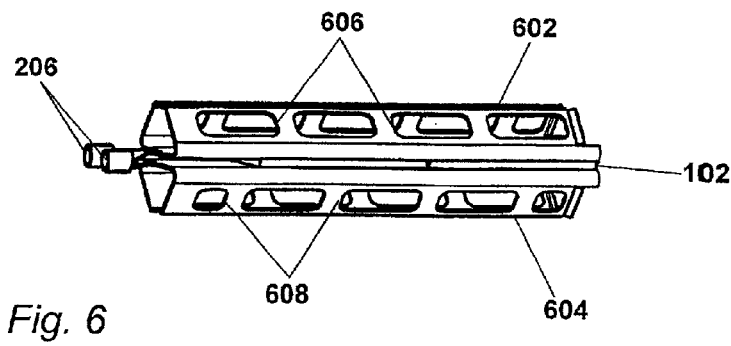
FIG. 6 illustrates the heat member according to the second embodiment.

FIG. 6 illustrates the heat member of the second embodiment of the present invention. In this example the heat conducting sheets 602, 604 have openings 606, 608 allowing for a lateral fuel guiding in transversal direction additionally to or in lieu of the axial fuel passage. As shown in FIG. 6, the openings 606, 608 are preferably located in slanted side surfaces of the heat conducting sheets 602, 604. The openings may however likewise be positioned at different locations such as in the top surfaces of the heat conducting sheets. The openings may further be provided in those surfaces of the heat conducting sheets 602, 604 or in the PTC heating element 102 which stay in direct mechanical and thermal contact so that a fuel flow may take place from the internal of one part of the heat conductor to another.

Figure 7:
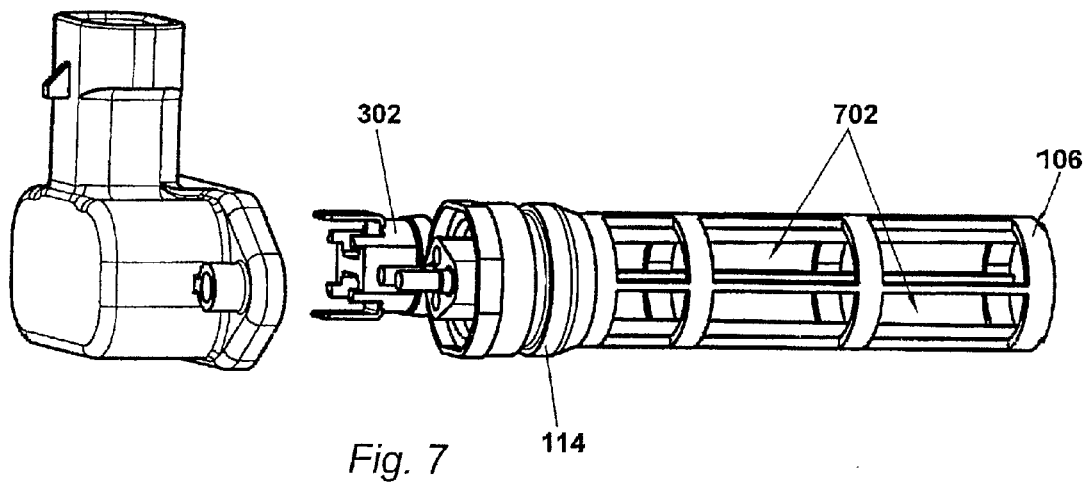
FIG. 7 illustrates the heater housing of the second embodiment.

FIG. 7 illustrates the heater housing of the second embodiment, again comprising openings in the side surface. These openings likewise serve for an extended fuel guiding due to lateral through-flow.

Figure 8:
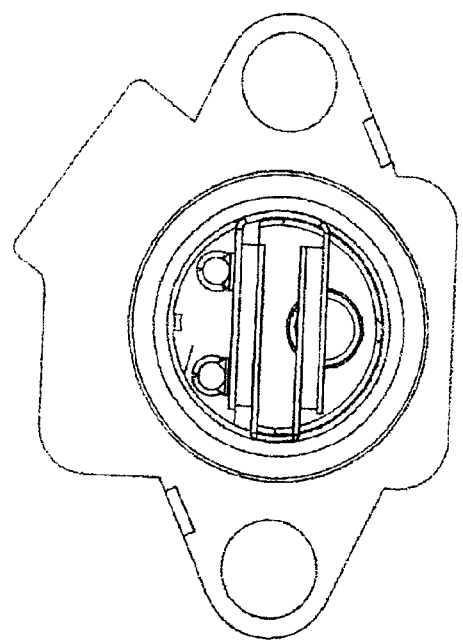
FIG. 8 illustrates a front view of a third embodiment of the fuel heating device according to the present invention.
Figure 9:
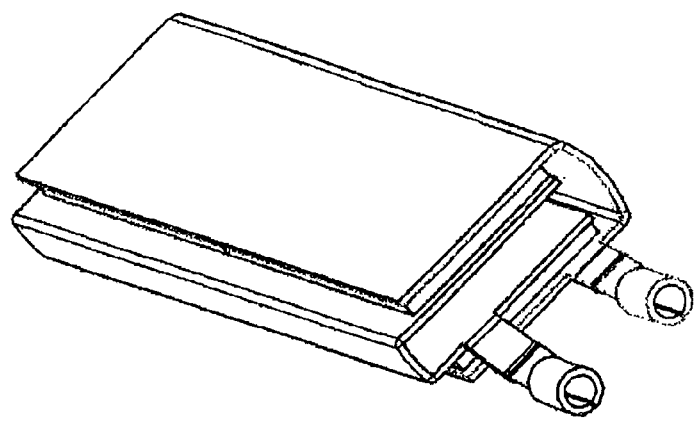
FIG. 9 illustrates the inner pad of the heat member of the third embodiment.

Turning now to FIGS. 8 and 9 which illustrate a third embodiment of the fuel heating device according to the present invention, it will become apparent that while in the first and second embodiment the heat conductor has been described as comprising two tubular parts arranged in parallel, three parts may likewise be used. In the embodiment of FIGS. 8 and 9, two PTC heating elements are used with one being located between the left and middle tubular part, and the other being located between the middle and right tubular part.

As described from the foregoing, the present invention has many advantages in that heat transfer from the PTC heating element to the fuel is increased and a high rate of flow in combination with a compact constructional design has been made possible. Further, the heating device is compatible with many different kinds of diesel filter systems and may further be used as supplementary accessory system. The heating device may easily be assembled and disassembled and is mechanically stable, lightweight and reliable.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. For example, while the invention has been described as including two or three tubular parts in the heat conductor, it is apparent to those of ordinary skill in the art that any other number of tubular parts may be used. It addition, those areas in which it is believed that those skilled in the art are familiar, have not been described herein in order to not unnecessarily obscure the invention described herein. Accordingly, it is to be understood that the invention is not to be limited by the specific illustrative embodiments but only by the scope of the appended claims.

What is claimed is:

1. Diesel filter system, comprising:

filter means and fuel heating means including a PTC (Positive Temperature Coefficient) heating element and a rod-shaped heat conductor being in thermal contact with the PTC heating element, characterized in that said rod-shaped heat conductor comprises at least two tubular parts arranged in parallel, said PTC heating element being located between said at least two tubular parts, wherein the PTC heating element and the heat conductor are surrounded by a rod-shaped heater housing, and wherein said heater housing comprises a side surface having openings.

2. The diesel filter system of claim 1, wherein the heat conductor is formed of metal sheet.

3. The diesel filter system of claim 1, wherein said at least two tubular parts have openings allowing for a transversal passage of the fuel.

4. The diesel filter system of claim 1, wherein said rod-shaped heater housing is made of plastics.

5. The diesel filter system of claim 1, wherein said rod-shaped heater housing has a diameter of about 0.8".

6. The diesel filter system of claim 1, wherein said rod-shaped heater housing has a length of about 3.1".

7. The diesel filter system of claim 1, wherein said rod-shaped heater housing comprises a housing base part.

8. The diesel filter system of claim 7, wherein the housing base part comprises a temperature switch.

9. The diesel filter system of claim 7, wherein said housing base part is connected to electrical plug-in connectors being connected to said PTC heating element.

10. The diesel filter system of claim 7, wherein said housing base part is formed so that a connecting part may be put in.

11. The diesel filter system of claim 1, wherein said PTC heating element comprises of plurality of thermistors.

12. Fuel heating device for use with diesel filter systems, comprising:

a PTC (Positive Temperature Coefficient) heating element and a rod-shaped heat conductor being in thermal contact with the PTC heating element, characterized in that said rod-shaped heat conductor comprises at least two tubular parts arranged in parallel, said PTC heating element being located between said at least two tubular parts, wherein the PTC heating element and the heat conductor are surrounded by a rod-shaped heater housing, and wherein said heater housing comprises a side surface having openings.

13. The fuel heating device of claim 12, wherein said PTC heating element comprises a plurality of thermistors.

14. The fuel heating device of claim 12, wherein the heat conductor is formed of metal sheet.

15. The fuel heating device of claim 12, wherein said at least two tubular parts have openings allowing for a transversal passage of the fuel.

16. The fuel heating device of claim 12, wherein said rod-shaped heater housing is made of plastics.

17. The fuel heating device of claim 12, wherein said rod-shaped heater housing has a diameter of about 0.8".

18. The fuel heating device of claim 12, wherein said rod-shaped heater housing has a length of about 3.1".

19. The fuel heating device of claim 12, wherein said rod-shaped heater housing comprises a housing base part.

20. The fuel heating device of claim 19, wherein the housing base part comprises a temperature switch.

21. The fuel heating device of claim 19, wherein said housing base part is connected to electrical plug-in connectors being connected to said PTC heating element.

22. The fuel heating device of claim 19, wherein said housing base part is formed so that a connecting part may be put in.

* * * * *